US008856288B2

(12) United States Patent
Mehta et al.

(10) Patent No.: US 8,856,288 B2
(45) Date of Patent: Oct. 7, 2014

(54) METHOD AND APPARATUS FOR THE DISTRIBUTION OF CONFIGURATION DATA

(75) Inventors: Sapna Mehta, San Diego, CA (US); Lawrence Aldredge, La Jolla, CA (US); Daphna Zeilingold, San Diego, CA (US); Daniel A. Deninger, Carlsbad, CA (US); Philippe Bergman, San Diego, CA (US)

(73) Assignee: Omnitracs, LLC, San Diego, CA (US)

( * ) Notice: Subject to any disclaimer, the term of this patent is extended or adjusted under 35 U.S.C. 154(b) by 431 days.

(21) Appl. No.: 12/376,725

(22) PCT Filed: Aug. 31, 2007

(86) PCT No.: PCT/US2007/077422
§ 371 (c)(1),
(2), (4) Date: Feb. 6, 2009

(87) PCT Pub. No.: WO2008/048745
PCT Pub. Date: Apr. 24, 2008

(65) Prior Publication Data
US 2010/0191835 A1    Jul. 29, 2010

(51) Int. Cl.
*G06F 15/177* (2006.01)
*H04L 12/24* (2006.01)
*H04W 24/02* (2009.01)
*H04W 4/00* (2009.01)
*H04W 8/24* (2009.01)

(52) U.S. Cl.
CPC ............. *H04W 4/001* (2013.01); *H04L 41/082* (2013.01); *H04W 24/02* (2013.01); *H04W 8/245* (2013.01)
USPC ............ 709/220; 717/168; 717/170; 717/171

(58) Field of Classification Search
USPC .......... 709/220, 203, 217, 221, 222; 717/168, 717/170, 171, 172, 173
See application file for complete search history.

(56) References Cited

U.S. PATENT DOCUMENTS 7,003,767 B2 * 2/2006 Larkin ........................ 717/172
7,516,450 B2 * 4/2009 Ogura ........................ 717/168
(Continued)

FOREIGN PATENT DOCUMENTS

EP          1684169        7/2006
WO       2006110991       10/2006

OTHER PUBLICATIONS

International Search Report for International Application No. PCT/US2007/077422, dated Jun. 20, 2008, issued by the European Patent Office.

(Continued)

*Primary Examiner* — Jimmy H Tran
(74) *Attorney, Agent, or Firm* — Arent Fox LLP (57) ABSTRACT

Embodiments of methods and apparatuses for distributing configuration data to one or more mobile terminals. An embodiment of one method of the invention includes receiving from the host application a request from a client to transmit a configuration data value to a mobile terminal. The configuration data value can include a designation of a new precedence level for a mobile terminal corresponding to a new operating characteristic of the mobile terminal. The method can include the step of transmitting from the NMC a configuration data value including the new precedence level to the mobile terminal. The mobile terminal can include a mobile application defining a previous precedence level such that the mobile terminal loads the configuration data in response to the new precedence level different from the previous precedence level.

23 Claims, 9 Drawing Sheets

(56) References Cited

U.S. PATENT DOCUMENTS

| | | | |
|---|---|---|---|
| 7,747,995 B2* | 6/2010 | Fritsch et al. | 717/168 |
| 7,934,199 B2* | 4/2011 | Jostmeyer et al. | 717/121 |
| 8,170,540 B2* | 5/2012 | Zeilingold et al. | 455/419 |
| 8,594,653 B2* | 11/2013 | Zeilingold et al. | 455/419 |
| 2001/0029178 A1* | 10/2001 | Criss et al. | 455/419 |
| 2002/0002053 A1* | 1/2002 | Nam et al. | 455/456 |
| 2002/0019696 A1* | 2/2002 | Kruse | 701/207 |
| 2003/0105812 A1* | 6/2003 | Flowers et al. | 709/203 |
| 2003/0186662 A1* | 10/2003 | Himmel et al. | 455/185.1 |
| 2003/0214970 A1* | 11/2003 | Pimentel | 370/465 |
| 2004/0024795 A1* | 2/2004 | Hind et al. | 707/204 |
| 2004/0193694 A1* | 9/2004 | Salo et al. | 709/216 |
| 2005/0010916 A1* | 1/2005 | Hagen et al. | 717/170 |
| 2005/0068169 A1* | 3/2005 | Copley et al. | 340/539.13 |
| 2005/0270990 A1* | 12/2005 | Ukis | 370/254 |
| 2006/0168355 A1* | 7/2006 | Shenfield et al. | 709/250 |
| 2006/0193321 A1* | 8/2006 | Shell et al. | 370/389 |
| 2006/0212924 A1* | 9/2006 | Xie et al. | 726/1 |
| 2006/0236083 A1* | 10/2006 | Fritsch et al. | 713/1 |
| 2006/0236325 A1* | 10/2006 | Rao et al. | 719/315 |
| 2006/0277253 A1* | 12/2006 | Ford | 709/204 |
| 2007/0118507 A1* | 5/2007 | Bruner | 707/3 |
| 2007/0232265 A1* | 10/2007 | Park et al. | 455/410 |
| 2008/0126793 A1* | 5/2008 | Jostmeyer et al. | 713/100 |

OTHER PUBLICATIONS

OMA Device Management Protocol; Candidate Version 1.2; Internet Citation (Online) XP003018609, retrieved from the Internet: URL:http://www.openmobilealliance.org/release_program/docs/DM/V1_2-20060424-C.pdf . (2008).

Written Opinion—PCT/US2007/077422, International Search—Authority, European Patent Office, Jun. 20, 2008.

* cited by examiner

METHOD AND APPARATUS FOR THE DISTRIBUTION OF CONFIGURATION DATA

CLAIM OF PRIORITY UNDER 35 U.S.C. §119

The present Application for Patent claims priority to Provisional Application No. 60/843,341 entitled "CONFIGURATION DATA DISTRIBUTION DEVICE" filed Sep. 7, 2006, and to Provisional Application No. 60/844,182 entitled "METHOD AND APPARATUS FOR DISTRIBUTING CONFIGURATION DATA" filed Sep. 12, 2006, which were both assigned to the assignee hereof and hereby expressly incorporated by reference herein.

BACKGROUND

1. Field

The invention relates generally to the field of wireless communications, and more specifically to the field of data synchronization and distribution to a plurality of mobile wireless devices.

2. Background

With the increasing use of wireless satellite communications, consumers and businesses are employing a large number of wireless devices for both personal and business uses. Most wireless devices, or user terminals, are operating a number of software modules or mobile applications at any given moment. One software component that most user terminals employ is configuration data, which consists of the basis parameters through which the remaining mobile applications receive operating instructions. For example, in a mobile terminal that is responsible for vehicle tracking through GPS tracking, the mobile terminal can be configured to report its position periodically through a driver log. The software parameter that instructs the mobile terminal how often to transmit its driver log is an example of configuration data, but the driver log itself is merely a mobile application.

Currently, wireless communication service providers have competing models for how to distribute configuration data to a plurality of mobile terminals, such as a fleet of trucks using a mobile tracking application. In most existing systems, the configuration data is applied at various times, including the initialization of a new mobile terminal, re-initialization of mobile terminals following firmware upgrades, movements between customer accounts and the like. This automated functionality can be very useful in that a customer need not bother with checking whether certain configuration data, such as macros or other parameters, has been delivered following any of the aforementioned events. In the current systems, a customer can set a configuration data value once and then forget about it throughout the lifetime of the mobile terminal.

However, while current systems work well for ensuring timely updates, they do not allow for the customization of existing configuration data or the addition of new configuration data. Unfortunately, these failures are a barrier to the development of new products and new features for existing products. Moreover, any mobile application that is not used with the current distribution systems must design and develop its own method of distributing and maintaining configuration data. As such, the current systems are further limited in their ability to incorporate new mobile applications, and therefore new types of user terminals, into the existing configuration data distribution systems. Lastly, current systems tend to transmit configuration data in bulk passages, thus consuming a disproportionate amount of bandwidth. Especially in satellite communications, the undue consumption of bandwidth is an undesirable effect of the current systems for distributing configuration data.

Accordingly, there is a need in the art for a new system, method and/or apparatus for distributing configuration data to a plurality of mobile terminals in a wireless network. The new method should also seek to minimize bandwidth consumption by optimizing the processes through which user terminals are selected for updating configuration data.

SUMMARY

Embodiments of the invention include methods and apparatuses for distributing configuration data over a wireless satellite network to one or more user terminals. The methods and apparatuses are adapted to streamline the process of developing new configuration data and minimize the amount of software necessary for its distribution. The methods and apparatuses are further adapted to function through a range of mobile applications, including those developed by third-parties. The methods and apparatuses are further adapted to allow configuration data distribution to arbitrary or pre-selected mobile terminals, as opposed to distribution based on customer or fleet membership of the mobile terminal. Moreover, the methods and apparatuses are adapted to allow distribution of large configuration data packages, for example configuration data with a size greater than 1900 characters.

To that end, one embodiment of the invention includes a method of distributing configuration data including the steps of receiving from the host application, at a network management computer (NMC), configuration data related to a mobile application residing on one or more of the plurality of mobile terminals and receiving from the host application, at the NMC, a configuration data definition related to the configuration data. The first method further includes the steps of generating at the NMC a configuration data value including the configuration data and an update application identification identifying to which application the configuration data is applicable and receiving from the plurality of mobile terminals, at the NMC, an existing application identification relating to the mobile application residing on the plurality of mobile terminals. The first method can further include the steps of receiving from the host application, at the NMC, a request from a client to transmit the configuration data value to one or more of the plurality of mobile terminals; and transmitting to a predetermined set of the plurality of mobile terminals, from the NMC, the configuration data value in response to the existing application identification received from the plurality of mobile terminals such that the configuration data value is transmitted substantially exclusively to the predetermined set of mobile terminals for which the update application identification is substantially non-identical to the existing application identification.

In another embodiment, the present invention includes a method for distributing configuration data including the step of receiving from the host application, at the NMC, a request from a client to transmit a configuration data value to a mobile terminal. The configuration data value can include a designation of a new precedence level for a mobile terminal, wherein the new precedence level corresponds to a new operating characteristic of the mobile terminal. The second method can further include the step of transmitting from the NMC a configuration data value including the new precedence level to the mobile terminal. The mobile terminal can include a mobile application defining a previous precedence level such that the mobile terminal loads the configuration data in response to the new precedence level being substantially non-identical to the previous precedence level.

Other aspects and features are detailed below, including a number of example embodiments illustrating the flow of data from the host application to the mobile application across a range of scenarios.

DETAILED DESCRIPTION

Figure 1:
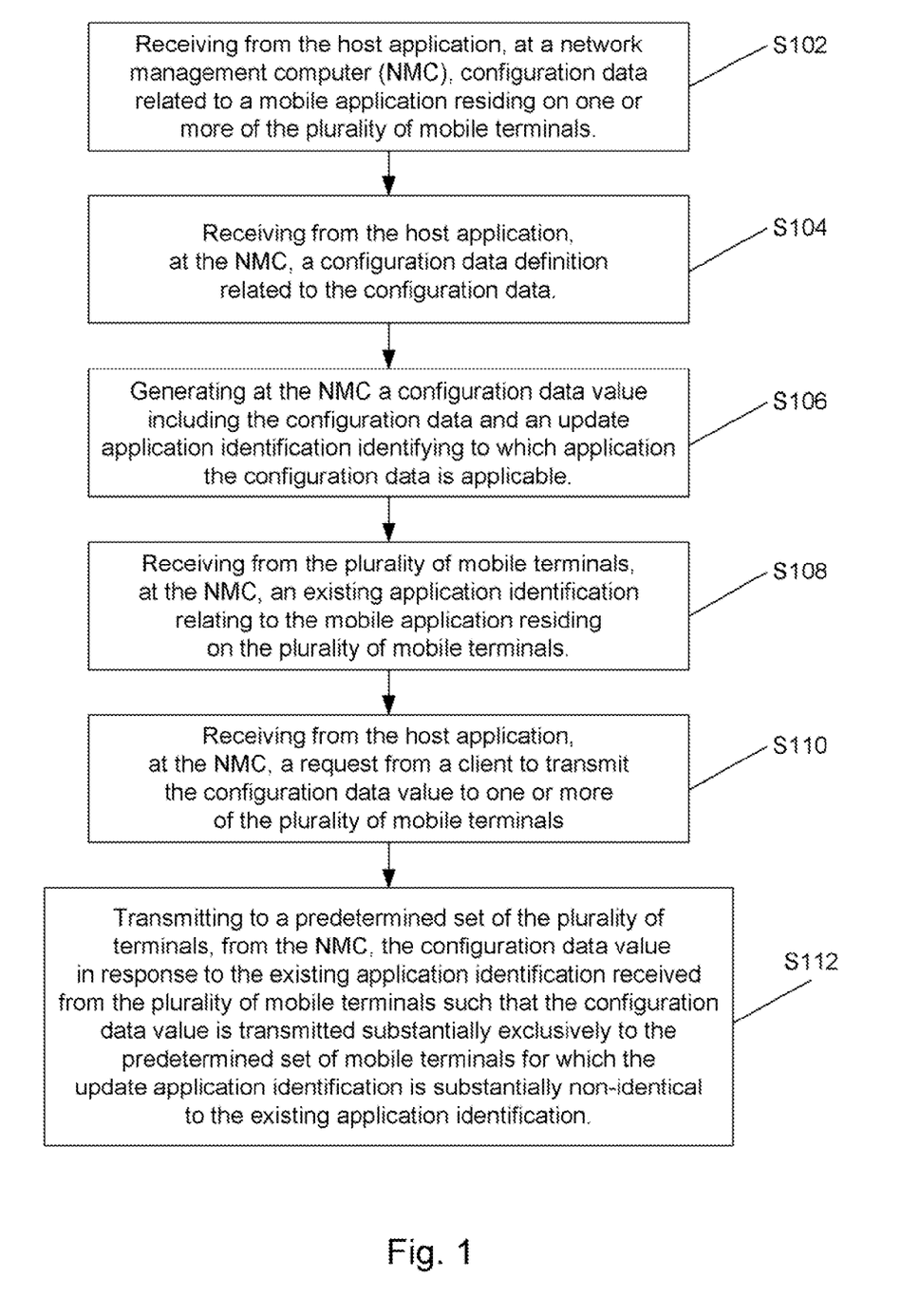
FIG. 1 is a flow chart depicting an embodiment of a method of distributing configuration data.

Disclosed are methods and apparatuses for distributing configuration data to one or more mobile terminals. One method of distributing configuration data is shown in the flowchart of FIG. 1. In particular, FIG. 1 illustrates a method for distributing configuration data from a host application to a plurality of mobile terminals in a wireless system in accordance with one embodiment. The method of the embodiment begins with step S102, which recites receiving from the host application, at a network management computer (NMC), configuration data related to a mobile application residing on one or more of the plurality of mobile terminals. The host application can include for example a third-party or customer software application and/or user interface through which the customer can direct the management of the plurality of mobile terminals. The NMC can include for example a network computer and/or computers that are adapted for remotely managing and communicating with the plurality of mobile terminals. The NMC can further include one or more processors adapted to run software in accordance with predetermined instructions, such as those consistent with the methods described herein.

Step S104 of the recites receiving from the host application, at the NMC, a configuration data definition related to the configuration data. As defined herein, the term configuration data denotes software code and/or instructions that affect the configuration of a mobile application that is adapted to run on one or more mobile terminals. As noted above, one example of configuration data is data relating to the frequency at which a mobile terminal reports its position to a central database. A configuration data definition can also include macro definitions, templates, pre-filled macro mappings, mobile terminal parameters such as a mobile initiated position report (MIPR) interval, mobile terminal software upgrades, as well one or more rules or parameters that define how the configuration data can be used by the mobile application.

Step S106 recites generating at the NMC a configuration data value including the configuration data and an update application identification identifying to which application the configuration data is applicable. In step S108, the method recites receiving from the plurality of mobile terminals, at the NMC, an existing application identification relating to the mobile application residing on the plurality of mobile terminals. The application identification functions to inform the NMC as to whether the applicable mobile application resides on any or all of the plurality of mobile terminals. For example, the application identification might indicate whether one or more mobile terminals in the truck fleet contain the mobile application relating to driver logs or position reporting.

Step S110 recites receiving from the host application, at the NMC, a request from a client to transmit the configuration data value to one or more of the plurality of mobile terminals. Accordingly, the method provides a client to request the transmission of configuration data to one or more mobile terminals associated with that client. Step S110 provides the client, such as a freight company, with the means for requesting that the configuration data be updated on each of its mobile terminals operating within the truck fleet. For example, a freight company might request that one or more of its trucks begin reporting its position on an hourly basis instead of a semi-hourly basis, and therefore request that the NMC transmit configuration data to the selected one or more trucks.

Step S112 recites transmitting to a predetermined set of the plurality of mobile terminals, from the NMC, the configuration data value in response to the existing application identification received from the plurality of mobile terminals such that the configuration data value is transmitted substantially exclusively to the predetermined set of mobile terminals for which the update application identification is substantially non-identical to the existing application identification. The predetermined set of the plurality of mobile terminals can be determined according to a group classification, customer classification, an arbitrary classification or by any other suitable selection methodology. As noted, the configuration data value is transmitted only to those mobile terminals that do not already have the same configuration data value, i.e. the same application identification. Accordingly, this method saves a substantial amount of bandwidth by not transmitting the configuration data value to user terminals on which the configuration data already resides.

In prior distribution systems, the transmitter of the configuration data was typically uncertain as to whether the mobile terminal had received and validated the configuration data. Accordingly, in one variation of the method, the method further includes the step of receiving, at the NMC, an acknowledgement message from one or more of the predetermined set of mobile terminals relating to the receipt of the configuration data value. The acknowledgement message can include for example a communication to the NMC that the mobile application residing on the mobile terminal received and validated the configuration data. Additionally, the method can further include the step of transmitting, from the NMC to the host application, a service acknowledgement message in response to the receipt of the acknowledgement message from the one or more of the predetermined set of mobile terminals. By doing so, the client will be continuously informed as to which of its mobile terminals and mobile applications have received and validated the configuration data.

In another variation of the method, the configuration data definition comprises a group value for classifying one or more of the plurality of mobile terminals into one or more groups. As noted before, the plurality of mobile terminals can be grouped according to a group classification, a customer classification, an arbitrary classification or by any other suitable selection methodology. Another suitable manner in which to group the one or more mobile terminals is by precedence level, which is defined herein as an organizational system through which mobile terminals can be selected, ranked, distinguished or otherwise grouped according to a client's predetermined protocols. For example, a precedence level can include a numerical ranking wherein each mobile terminal is assigned a precedence value, and each mobile application only uploads the configuration data if the precedence level of the configuration data meets or exceeds that of the mobile application.

In another variation of the method, a configuration data definition identification corresponding to the configuration data definition can be assigned and transmitted from the host application to the NMC. The configuration data definition identification can include one or more identifying messages or software code for enabling a mobile terminal to determine which configuration data it is receiving. To that end, the configuration data identification can be transmitted to the predetermined set of mobile terminals substantially simultaneously with the configuration data value.

Figure 2:
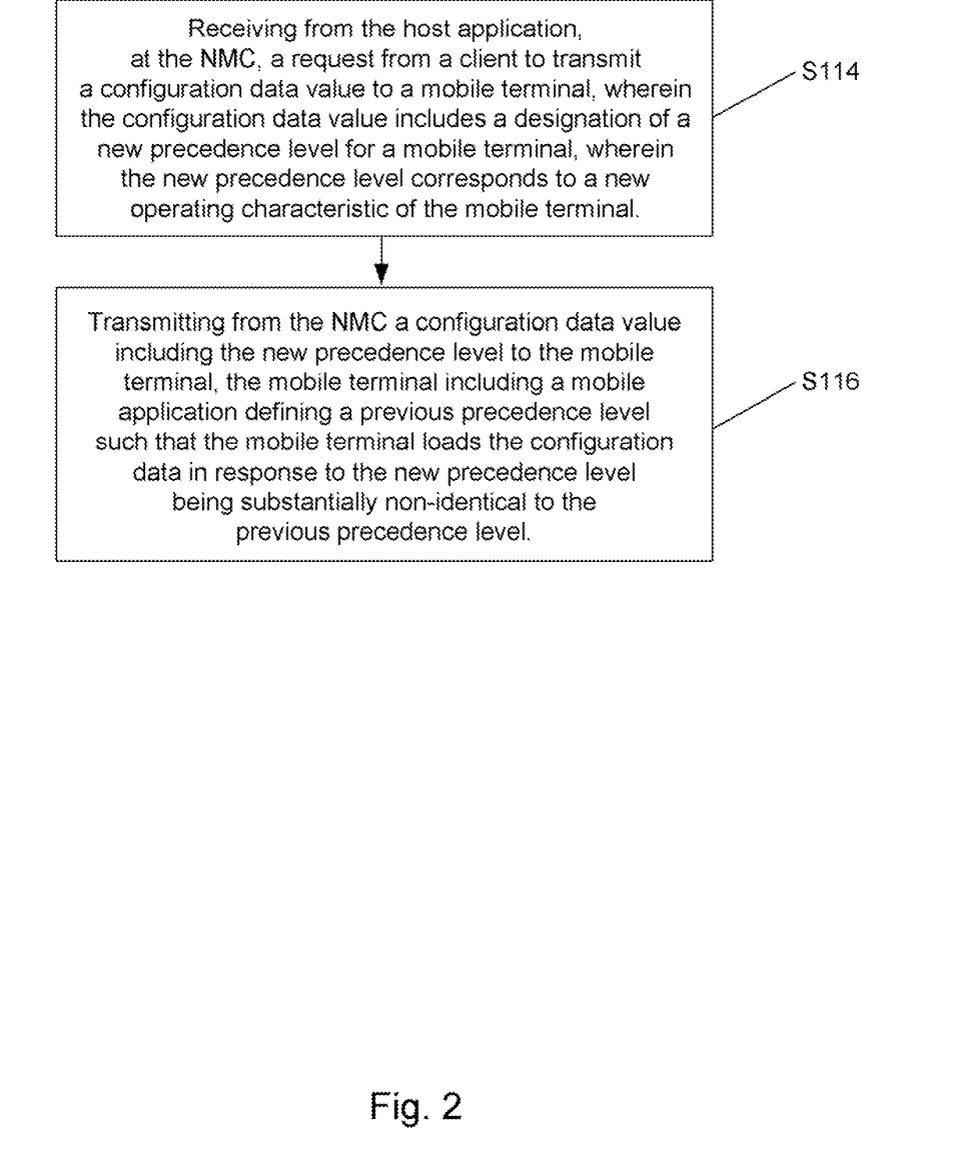
FIG. 2 is a flow chart depicting an embodiment of a method of distributing configuration data in accordance with another preferred embodiment of the present invention.

Another embodiment of a method for distributing configuration data to a mobile terminal in a wireless system is shown in FIG. 2 in which step S114 recites receiving from the host application, at the NMC, a request from a client to transmit a configuration data value to a mobile terminal. In step S114 the configuration data value includes a designation of a new precedence level for a mobile terminal, wherein the new precedence level corresponds to a new operating characteristic of the mobile terminal. Step S116 recites transmitting from the NMC a configuration data value including the new precedence level to the mobile terminal, the mobile terminal including a mobile application defining a previous precedence level such that the mobile terminal loads the configuration data in response to the new precedence level being substantially non-identical to the previous precedence level.

In a variation of the method, step is included for performing the transmission step for at least a second mobile terminal substantially simultaneously with the transmission to the first mobile terminal. The NMC can be configured for unicast, multicast and/or broadcast of the configuration data value, and as such the method is particularly useful in updating the operating characteristics of broadcast-ready mobile terminals.

The precedence level can be any type of signal that can be differentiated into levels, such as for example by timing, frequency, a binary data stream, an alphanumeric data segment, a numeric data segment or the like. For example, the precedence level can be represented numerically by a series of values ranging from zero to five, in which the lower number corresponds to a higher precedence level.

One suitable application for the method is in a fleet management system. In a typical fleet management system, a customer having one or more trucks is inclined to know for example the position, run time, operator, fuel level, etc. of the trucks in its fleet. To that end, each of the trucks in the fleet can have an onboard mobile terminal, such as a truck interface unit. The truck interface unit can be adapted to communicate with the NMC, and to record and transmit various data of interest to the customer, such as fuel level, fuel consumption, run time, operator identification, destination, origin, and position. The truck interface unit can also include a global position system (GPS) receiver configured to record the position of the truck. Other suitable positioning systems, such as GLONASS or Galileo could also be incorporated into the truck interface unit, depending upon the location and/or destination of the truck.

In a typical fleet management system, the host application can request that selected trucks be organized into groups, such as for example an individual unicast group, a fleet multicast group, a metropolitan multicast group and/or a long haul multicast group. The client, through the host application, can establish the precedence levels for each of the groups from highest precedence to lowest precedence: individual, metropolitan, long haul, and fleet, and sends the applicable precedence levels to the respective trucks with the setting. Configuration data values, including precedence level designations, can be received by a mobile terminal resident on a truck, such as for example the truck interface unit noted above.

As an example, a truck can receive a multicast fleet position report setting of sixty minutes with a precedence level of three from the NMC, after which time the truck will report its position every sixty minutes. Subsequently, the truck can receive a multicast metropolitan position report of thirty minutes with a precedence level of one from the NMC, and the truck will begin employing the subsequent reporting period configuration data because the precedence level of the latter is higher than the former. Similarly, a truck having an individual unicast report setting of five minutes and a precedence level of zero is configured to report its position every five minutes. If the individual unicast truck receives the broadcast long haul and fleet position reports with precedence levels of two and three, respectively, then the individual truck will ignore these broadcast configuration data transmissions because of their lower precedence levels.

In a variation, the customer can remove the precedence level settings through the host application, which are then communicated to the NMC and then to one or more trucks within the fleet. In the event that the precedence level settings are removed for any group and/or unicast unit, the group and/or unit will revert to a lower level precedence setting unless and until its precedence level is re-established through another configuration data transmission. Similarly, the customer, through the host application, can change the precedence rules and/or rankings for each of the groups and send out new settings. Any changes will not affect the operation of the trucks, as each of the mobile terminal resident thereon are configured solely to compare an existing precedence level with that of the configuration data message. Accordingly, the customer, through the host application, can change, delete or reorganize the relative hierarchy of the precedence levels as well as the characteristics associated with each precedence level without directly interacting with any trucks in the fleet.

Figure 3:
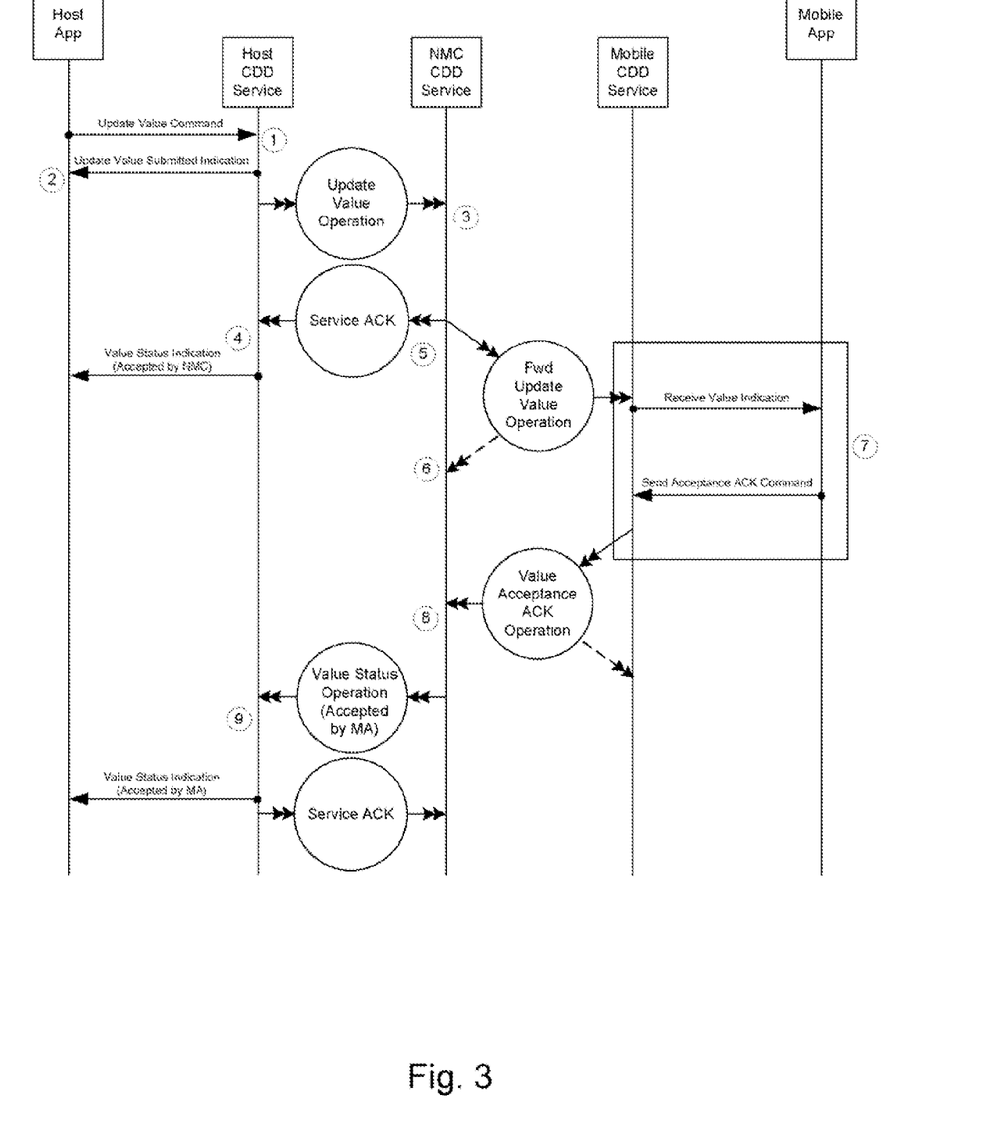
FIG. 3 is a schematic diagram of an embodiment of a method for updating the configuration data of a mobile terminal.

Other aspects and features of the methods are shown in the exemplary embodiments of FIGS. 3 through 9. FIG. 3 is a schematic diagram of a timeline of communications between a host application and a mobile application. At time (1) the host application sends a Configuration Data Value to the Host CDD Service Segment using the Update Value command. Upon receiving this command, the Host CDD Service Segment: performs the necessary Application-Service interface reliability processing (e.g., duplicate detection), assigns a Global ID (GID) to the Configuration Data Value, stores the Configuration Data Value and its control information in durable storage, records a Timestamp for its internal use which may or may not be sent to the NMC, sets the Configuration Data Value Status to Accepted by Host-CDD/Pending, returns the GID to the application in the Update Value Submitted indication, and submits an Update Value operation to the Host-NMC Interface (HNI) layer for delivery to the NMC, including the control information sent in the Update Value command, and the allocated GID and Value.

At time (2), the Host Application receives the Update Value Submitted indication, and saves the GID in order to marry the subsequent status indications with the initiating Update Value command. At time (3), the NMC, through its CDD service segment, receives the Host to NMC Update Value operation. Subsequently, the NMC CDD service segment: performs HNI interface reliability processing, including duplicate detection, in-order and gap detection and performs authorization checks. The authorization checks can include for example checking whether the destination address is valid. For a Unit Address, it checks that the mobile terminal is a subscribing or otherwise compatible unit. For a Group Address, it interfaces with a Group Management Service to verify that a Group with that address is defined. A Unit Address range can be used to indicate whether the Unit Address is a group or Unit Address. Another authorization performed by the NMC CDD service segment can include for example checking whether the sender is allowed to update the value, for example whether the CDEF state that the host has write permission, whether the virtual channel in the GID is equal to the virtual channel listed in the CDEF, or whether this the appropriate base or sub account for the customer.

The NMC CDD service segment can be further adapted to validate the configuration data value using the information specified for the corresponding CDEF as configuration data value updates can be restricted to known CDEFs. The NMC CDD service segment can also be adapted to interfaces with the application to perform additional semantic validation checks, and set a configuration data value status to Pending/Accepted by the NMC CDD service segment. Further, the NMC CDD service segment can be adapted to update a CDEF State Table and make the Update Value operation durable, record a timestamp (Accepted by NMC), and write an accounting record including any customer billing parameters that are specified by the CDEF. The NMC CDD can be further adapted to submit a service acknowledgement message back to the Host CDD service segment.

At time (4), the Host CDD service segment receives the service acknowledgement message and in response thereto sends a Value Status indication to the Host Application conveying the status. The Host CDD service segment can be further adapted to discard the data it had previously stored when it accepted the Update Value command at time (1).

After sending the service acknowledgement back to the Host, the NMC CDD Service segment can use a search path to find an active value relating to the configuration data unit value at time (5). If the received configuration data unit value is defined, then it becomes the active value according to the precedence rules set forth above because unit value has the highest precedence in the search path. Accordingly, the NMC CDD service segment can submit a Fwd Update Value operation to the (generic over the air protocol) GOTAP layer's unit addressed protocol to transfer this Active Configuration Data Unit Value over-the-air to the mobile terminal. On the other hand, if the received configuration data value is undefined, then the group value becomes the new active value per the search path. The group value can be for example a fleet group value. The NMC CDD service segment can submit a Fwd Update Value operation to GOTAP layer's unit addressed protocol to inform the mobile terminal of any individual override removal and also supply the Group Value to the mobile terminal if needed.

When the GOTAP layer at the mobile terminal has successfully received the Fwd Update Value operation, it initiates a Transport-layer acknowledgement back to the NMC at time (6). When the NMC GOTAP layer receives this acknowledgement, it can convey the acknowledgment to the NMC CDD service segment. Upon receipt of the acknowledgement, the NMC CDD service segment is adapted to update the status of the Active Value for the mobile terminal successful in the CDEF state table and record a timestamp memorializing the receipt of the acknowledgement.

Upon reception of the Fwd Update Value operation at time (7), the mobile terminal CDD service segment can use a precedence entry and/or override information included in the received operation to find out if the received CDD value is the Active Value. If it is the Active Value, then the mobile terminal CDD service segment makes the Value durable along with its related context information and sets its status to pending. In this embodiment, the mobile terminal CDD service segment stores sufficient context information about the Active Value to be able to distinguish and discard non-Active Values received in the future (e.g., if it subsequently receives a value having a lower precedence level). The mobile terminal CDD service segment then sends the received Active Value to the owning mobile application via a Receive Value indication. The owning mobile application is identified by the virtual channel in the corresponding GID. The Receive Value indication can be sent even if an individual override is being deleted and no group value has been supplied such that the mobile application can be informed that the Value is being deleted and sent back an acceptance acknowledgement.

Upon receiving the Active Value via the Receive Value indication, the Mobile Application validates the CDD Value. To indicate its acceptance of the Value, the Mobile Application can return a Send Acceptance acknowledgement command. This acknowledgement recites that the Mobile Application has received and validated the CDD Value. In an effort to preserve bandwidth and optimize the methods, the mobile application immediately returns the Acceptance acknowledgement even if it is not using the CDD Value to prevent unnecessary OTA re-downloads of the CDD Value.

Alternatively, the methods can be configured such that mobile applications only send back an Acceptance acknowledgement/non-acknowledgement for a received Configuration Data Value if they recognize the CDEF ID. The mobile terminal CDD service segment can continue to store the Pending Value even if the mobile application does not send back an Acceptance message. The mobile terminal CDD service segment can continue storing the Values so that when the application is upgraded, it can consume the stored Values it recognizes and the NMC does not need to re-send these Configuration Data Values over-the-air. Upon receiving the Send Acceptance acknowledgement command the mobile terminal CDD service segment: submits a Value Acceptance acknowledgement operation to GOTAP unit-addressed protocol to relay the Acceptance status back to the NMC.

At time (8), when the NMC CDD service segment receives the Value Acceptance acknowledgement operation from the mobile terminal it is adapted to set the status of the Value for the mobile to Accepted by the mobile application, update the CDEF State Table, discard the Transport ACK Received Timestamp and record the time the Acceptance acknowledgement was received. The NMC CDD service segment can communicate the status of the mobile terminal via a Value Status operation transmitted to the Host CDD service segment.

At time (9), the Host CDD service segment receives the Value Status operation from the NMC CDD service segment.

Upon receipt, the Host CDD service segment can be adapted to submit a Service acknowledgement to the HNI layer as a Service and Transport layer acknowledgement to the Value Status operation received from the NMC and transmit the Accepted by mobile application status to the Host Application via a Value Status indication. Subsequently, the customer will be informed as to the status of the configuration data update provided for and transmitted to one or more mobile applications.

Figure 4:
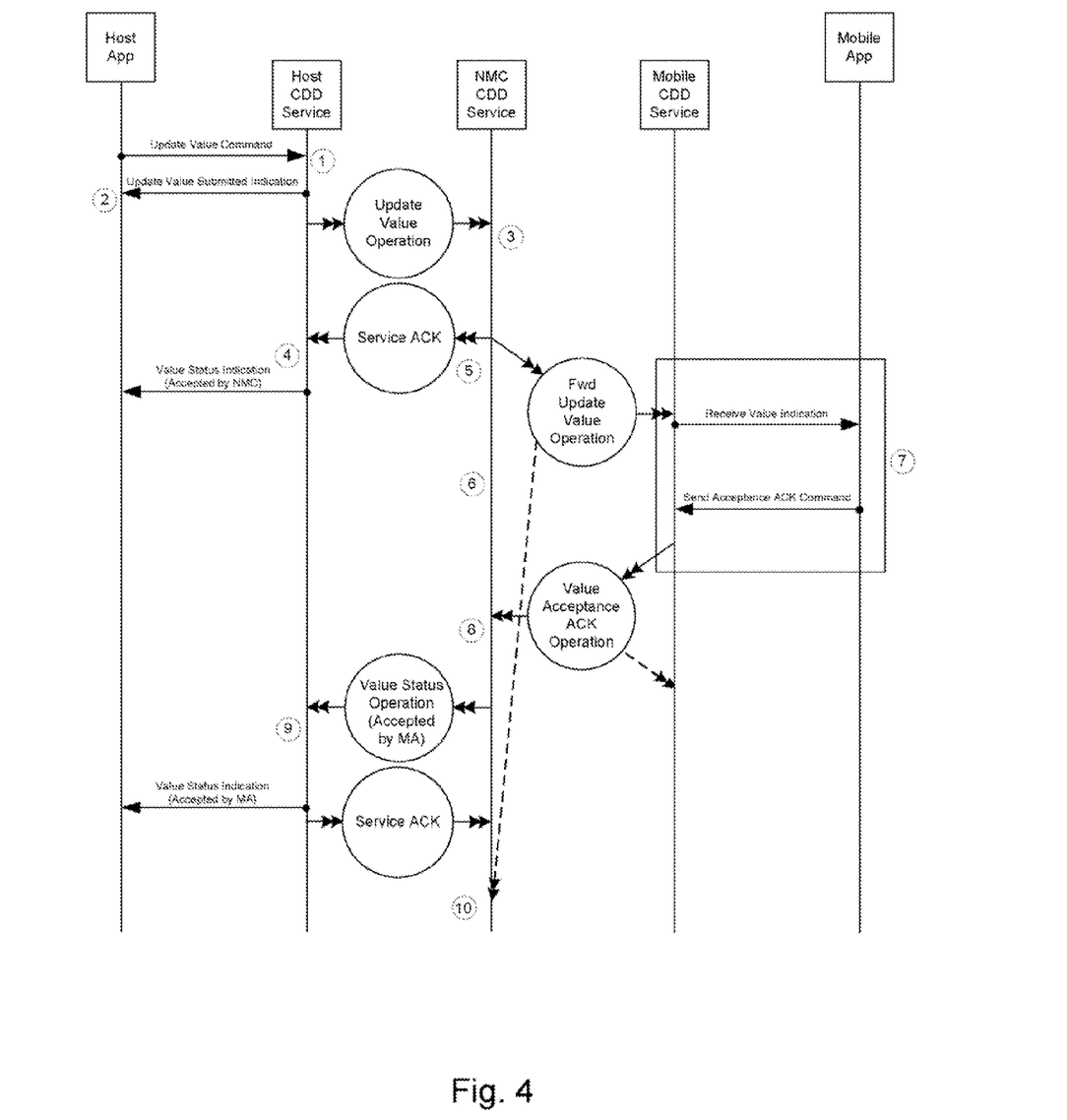
FIG. 4 is a schematic diagram of another embodiment of a method for updating the configuration data of a fleet of mobile terminals.

FIG. 4 is another schematic diagram of a timeline of communications between a host application and a mobile application in accordance with a another example. The example shown in FIG. 4 is similar to that shown in FIG. 3, but it includes an additional step at time (10) in which the NMC's GOTAP layer is adapted to convey the completion status to the NMC CDD service segment. Upon reception of this indication, the NMC CDD service segment sets the status of the CDD Value to Transport to Group Complete and updates the CDEF State Table. In this alternative, only GOTAP unit addressed protocol will be used to distribute the Fleet Group Value in any subsequent transmissions.

Figure 5:
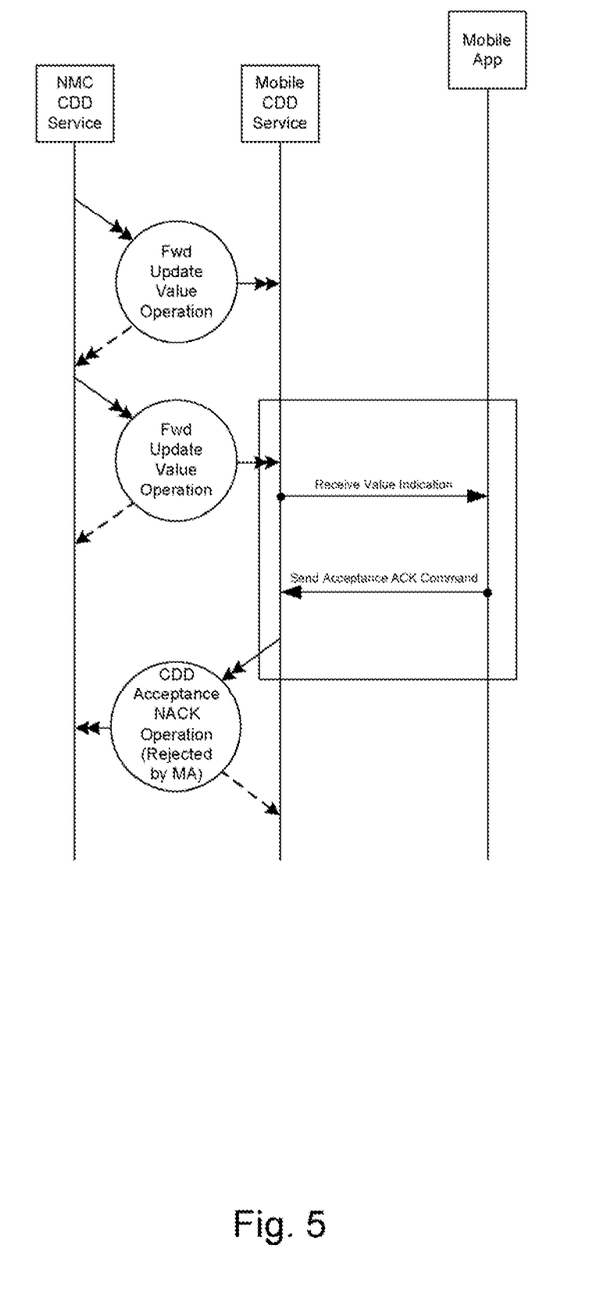
FIG. 5 is a schematic diagram of an embodiment of a method for updating the configuration data value of a mobile terminal.

FIG. 5 is a schematic timeline of a particular communication scenario in which a Configuration Data Value has been updated and the mobile is not in coverage, i.e. out of satellite coverage. In this example embodiment, the transmit schedule for the Fwd Update Value operation has completed (indicated via the double-headed dashed arrow) and the NMC CDD service segment has not received either a transport layer acknowledgement or an Acceptance acknowledgement from the mobile terminal. Under these circumstances, the NMC-CDD service segment waits until it detects that the mobile terminal is in coverage and talking to the NMC.

Upon detection of the mobile terminal, the NMC CDD Service Segment checks for Active Values (for the mobile terminal) or context information that it believes the mobile terminal has not yet received and which are not being distributed by GOTAP. If the NMC CDD service segment finds an Active Value, it submits a Fwd Update Value operation to the GOTAP layer's unit addressed protocol to transfer the active configuration data value over-the-air to the mobile terminal. Alternatively, the NMC can be configured such that every time a unit is detected on-air, NMC-CDD is notified to verify if it needs to send configuration data values, thereby preserving the limited bandwidth that might otherwise be consumed by broadcasting configuration data values as mobile terminals pass in and out of coverage.

Figure 6:
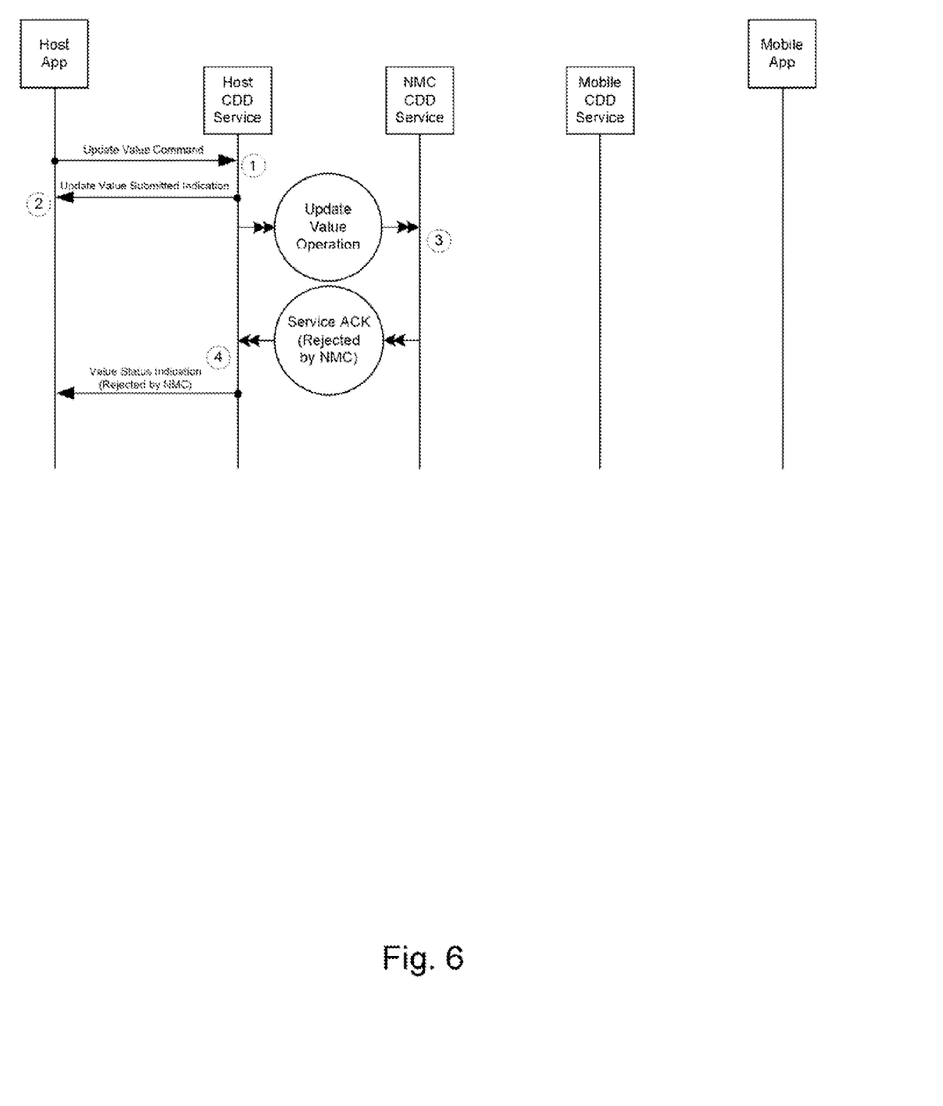
FIG. 6 is a schematic diagram of an embodiment of a method for updating the unit value of a mobile terminal.

FIG. 6 is a schematic timeline of a particular communication scenario in which a Configuration Data Value has been updated and is subsequently rejected by the NMC. As shown in FIG. 6, at time (3) the NMC receives the Update Value operation from the host CDD service segment. Upon receiving the Update Value operation, the NMC CDD service segment is adapted to perform an HNI interface reliability test and perform authorization checks, which can in fail as shown in FIG. 6. The NMC CDD service segment can be further adapted to submit a Service acknowledgement, including rejection status and the Timestamp of when the rejection occurred, to the HNI layer to indicate that the NMC has rejected the update. The NMC CDD service segment can then discard the rejected Value.

At time (4) the Host CDD service segment receives the Service acknowledgement. Upon receiving the Service ACK, the Host CDD service segment can be adapted to send a Value Status indication back to the Host Application conveying the rejection status and discard the previously stored data accepting the Update Value command at time (1).

Figure 7:
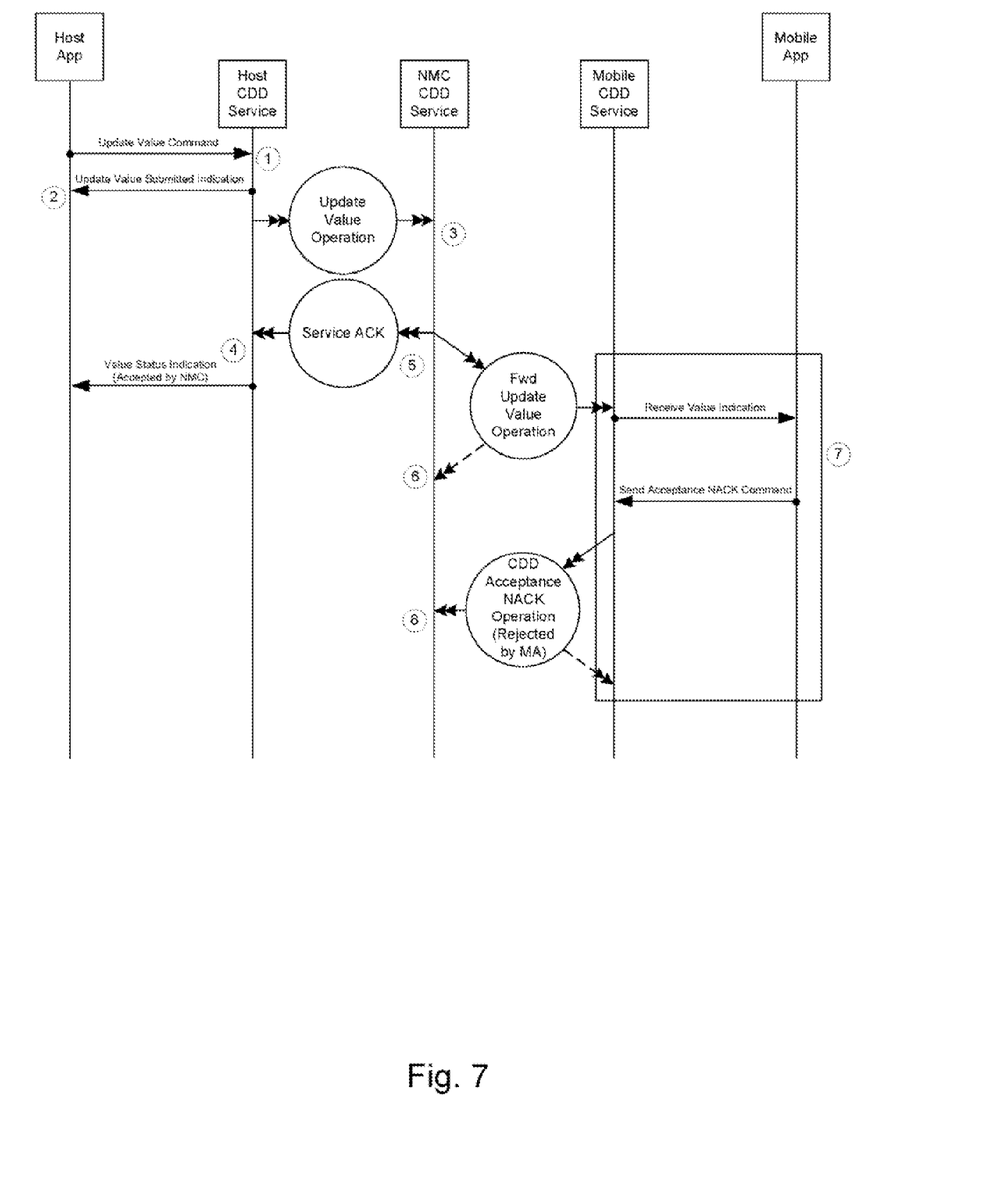
FIG. 7 is a schematic diagram of another embodiment of a method for updating the unit value of a mobile terminal.

FIG. 7 is a schematic timeline of a particular communication scenario in which a Configuration Data Value has been updated and is subsequently rejected by the mobile application. At time (7) when the mobile terminal CDD service segment receives the rejection status from the mobile application via the Send Acceptance non-acknowledge command, it is adapted to check that the status of the associated Value is not already rejected by the mobile application. That is, the mobile terminal does not relay the rejection back to the NMC if it believes that the NMC has already been informed that the Value was rejected by the mobile application. Alternatively, if the NMC has not been informed of the rejection, then the rejection status can be relayed to the NMC. The mobile terminal CDD service segment can be further adapted to update the status of the Pending Value to Rejected by the mobile application. The mobile terminal CDD service segment can be further adapted to send an Accepted Value, if present, to the mobile application to ensure that the mobile application reverts back to using the previously Accepted Value stored in its database. At time (7), upon receiving the CDD Acceptance non-acknowledgement operation from the mobile, the NMC CDD service segment can update the status of the Value and the CDEF State Table, and log and display information about the rejection for diagnostic purposes.

Figure 8:
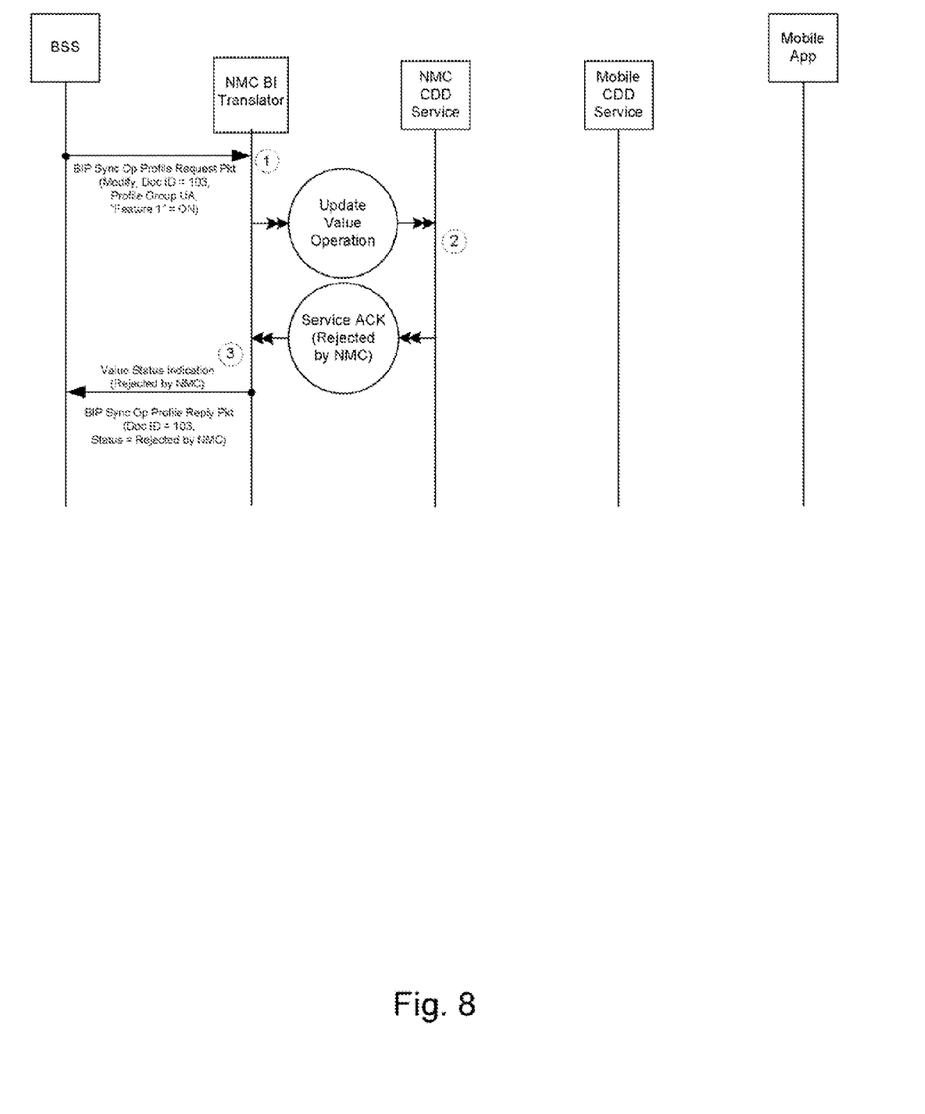
FIG. 8 is a schematic diagram of yet another embodiment of a method for updating the unit value of a mobile terminal.
Figure 9:
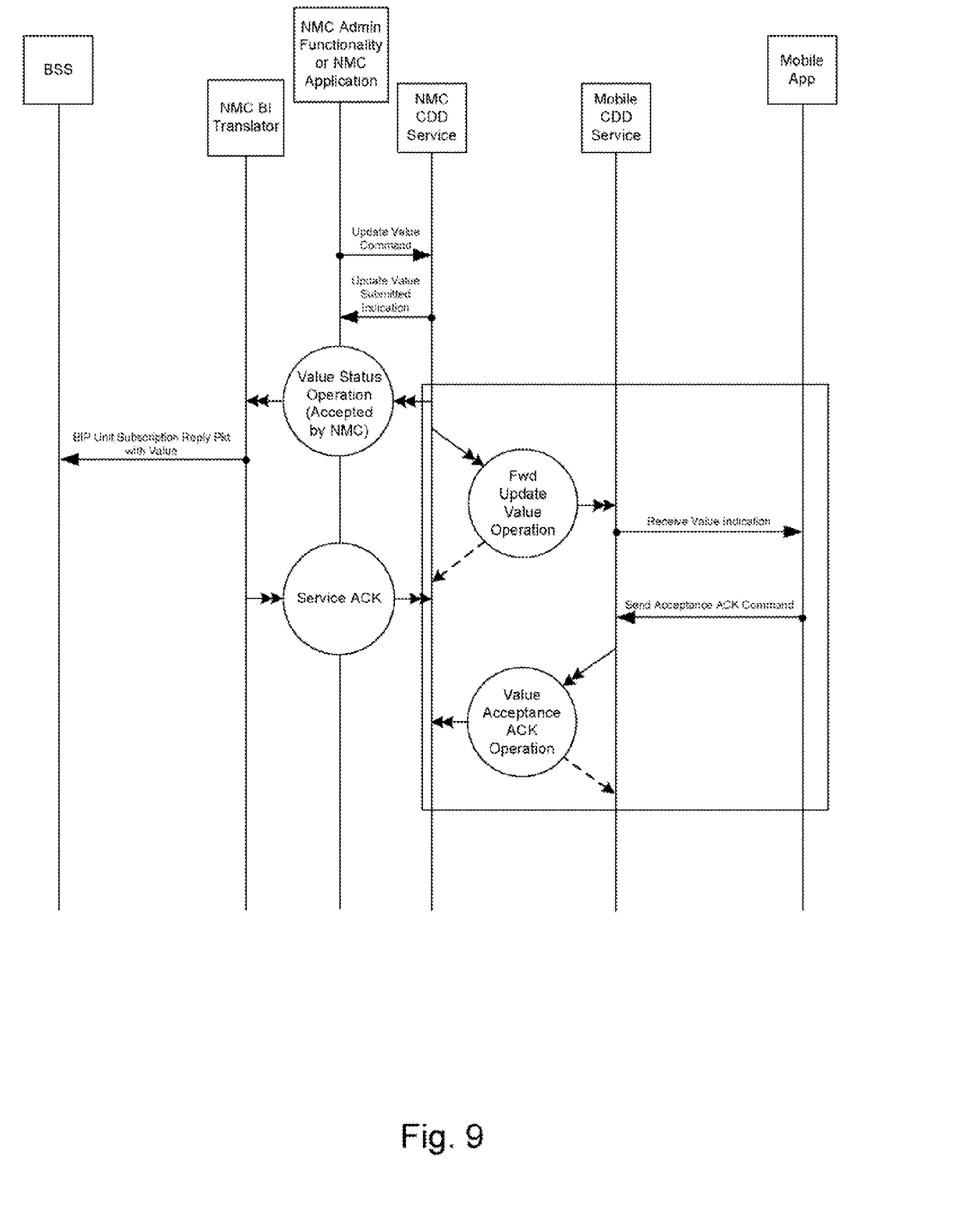
FIG. 9 is a schematic diagram of an embodiment of a method for populating a mobile terminal with data.

FIG. 8 is another example timeline of a particular communication scenario in which a Configuration Data Value has been updated and is subsequently rejected by the NMC. As shown in FIG. 8, at time (1) a Business Service Segment (BSS) transmits an Update Value operation to the NMC, where it is received at time (2) at the NMC following a hand-off from a NMC business interface (BI) translator. Upon receiving the Update Value operation, the NMC CDD service segment is adapted to perform authorization checks, which can fail as in the present example, as well as submit a Service acknowledgement including the rejection status, GID and a timestamp of when the rejection occurred. Subsequently, the NMC CDD service segment can discard the rejected value. At time (3), the Service acknowledgement is received at the NMC BI Translator, which in turn can send a BIP Sync Operational Profile Reply Packet back to the BSS conveying the rejection status.

FIG. 8 is another schematic timeline of a particular communication scenario in which an NMC User updates a Unit Configuration Data Value of interest to the BSS. Unlike the preceding example shown in FIG. 8, instead of the NMC CDD Service Segment receiving a BSS to NMC Update Value operation, it receives an Update Value command over an NMC Application/Admin-Service interface. In this scenario, the NMC CDD Service Segment is responsible for assigning a GID to the request rather than the NMC BI Translator. The NMC CDD Service Segment can issue Value Status operations to the NMC BI Translator for NMC initiated updates if the BSS has read permission for the configuration data. In doing so, the BSS remains informed of Configuration Data Value updates carried out on other segments (i.e., segment synchronization). Upon reception of the Value Status operation, the NMC BI Translator conveys the Unit Configuration Data Value update to BSS via the BIP Unit Subscription.

It will be understood that the methods, apparatuses, and systems described herein can be embodied in a number of ways and utilized in a number of environments, including for example in a fleet management system. For example, information and signals can be represented using any of a variety of different technologies and techniques. For instance, data, instructions, commands, information, signals, bits, symbols, and chips that may be referenced throughout the above description may be represented by voltages, currents, electromagnetic waves, magnetic fields or particles, optical fields or particles, or any combination thereof.

It should also be noted that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal, which can include for example a vehicular charging system of the type described above. In the alternative, the processor and the storage medium may reside as discrete components in a user terminal.

The previous description of the preferred and example embodiments is provided to enable any person skilled in the art to make, use, or practice the invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for distributing configuration data from a host application to a plurality of mobile terminals in a wireless system, comprising:

receiving from the host application, at a network management computer (NMC), configuration data related to a mobile application residing on one or more of the plurality of mobile terminals, the configuration data comprising software code and instructions for a configuration of a mobile application;

receiving from the host application, at the NMC, a configuration data definition related to the configuration data, wherein the configuration data definition comprises a group value for classifying one or more of the plurality of mobile terminals into one or more groups;

generating at the NMC a configuration data value including the configuration data and an update application identification identifying to which application the configuration data is applicable in response to receiving the configuration data and the configuration data definition;

receiving from the plurality of mobile terminals, at the NMC, an existing application identification relating to the mobile application residing on the plurality of mobile terminals;

receiving from the host application, at the NMC, a request from a client to transmit the configuration data value to one or more of the plurality of mobile terminals; and transmitting to a predetermined set of the plurality of mobile terminals, from the NMC, the configuration data value in response to the existing application identification received from the plurality of mobile terminals such that the configuration data value is transmitted to the predetermined set of mobile terminals for which the update application identification is non-identical to the existing application identification, wherein the predetermined set of the plurality of mobile terminals is based in part on the group value.

2. The method of claim 1, further comprising receiving, at the NMC, an acknowledgement message from one or more of the predetermined set of mobile terminals relating to the receipt of the configuration data value.

3. The method of claim 2, further comprising transmitting, from the NMC to the host application, a service acknowledgement message in response to the receipt of the acknowledgement message from the one or more of the predetermined set of mobile terminals.

4. The method of claim 1 further comprising receiving from the host application, at the NMC, a configuration data definition identification corresponding to the received configuration data definition.

5. The method of claim 4, wherein the configuration data definition identification is transmitted to the predetermined set of mobile terminals simultaneously with the configuration data value.

6. The method of claim 1, comprising:

receiving from the host application, at the NMC, a request from a client to transmit the configuration data value to a predetermined mobile terminal, wherein the configuration data value includes a designation of a new precedence level for a mobile terminal, wherein the new precedence level corresponds to a new operating characteristic of the mobile terminal, the configuration data comprising software code and instructions for a configuration of a mobile application, and wherein the request includes a grouping request to classify at least the mobile terminal based in part on the precedence level; and transmitting, from the NMC, the configuration data value including the new precedence level to the mobile terminal in response to receiving the request from the client, the mobile terminal including a mobile application defining a previous precedence level such that the mobile terminal loads the configuration data in response to the new precedence level being non-identical to the previous precedence level.

7. The method of claim 6, further comprising:
performing the transmitting of the configuration data value simultaneously for at least a second mobile terminal.

8. The method of claim 6, wherein the new precedence level and the previous precedence level are hierarchical.

9. The method of claim 8, wherein the new precedence level and the previous precedence level are represented by numerical values.

10. The method of claim 9, wherein the transmitting, from the NMC, the configuration data value including the new precedence level to the mobile terminal in response to receiving the request from the client, the mobile terminal loading the configuration data value in response to the new precedence level being greater than the previous precedence level.

11. The method of claim 6, wherein the mobile terminal comprises a truck interface unit adapted to provide positioning data with respect to a truck.

12. The method of claim 6, wherein the configuration data value comprises a position reporting interval.

13. A network management computer (NMC) for distributing configuration data from a host application to a plurality of mobile terminals in a wireless system, the NMC comprising:
a memory comprising instructions to:
receive, from a host application, configuration data related to a mobile application residing on one or more of a plurality of mobile terminals, the configuration data comprising software code and instructions for a configuration of a mobile application;
receive from the host application a configuration data definition (CDEF) related to the configuration data, wherein the CDEF comprises a group value for classifying one or more of the plurality of mobile terminals into one or more groups;
generate at the NMC a configuration data value including the configuration data and an update application identification identifying to which application the configuration data is applicable in response to receiving the configuration data and the configuration data definition;
receive from the plurality of mobile terminals an existing application identification relating to the mobile application residing on the plurality of mobile terminals;
receive from the host application a request from a client to transmit the configuration data value to one or more of the plurality of mobile terminals; and
transmit to a predetermined set of the plurality of mobile terminals, the configuration data value in response to the existing application identification received from the plurality of mobile terminals such that the configuration data value is transmitted to the predetermined set of mobile terminals for which the update application identification is non-identical to the existing application identification, wherein the predetermined set of the plurality of mobile terminals is based in part on the group value; and a processor in communication with the memory and configured to execute the instructions.

14. The NMC of claim 13, wherein the memory further comprises instructions to receive an acknowledgement message from one or more of the predetermined set of mobile terminals relating to the receipt of the configuration data value.

15. The NMC of claim 14, wherein the memory further comprises instructions to transmit to the host application a service acknowledgement message in response to the receipt of the acknowledgement message from the one or more of the predetermined set of mobile terminals.

16. The NMC of claim 13, further wherein the memory further comprises instructions to receive from the host application a configuration data definition identification corresponding to the received configuration data definition.

17. The NMC of claim 16, wherein the configuration data definition identification is transmittable to the predetermined set of mobile terminals simultaneously with the configuration data value.

18. The NMC of claim 13, wherein the memory further comprises instructions to:
receive from the host application a request from a client to transmit the configuration data value to a predetermined mobile terminal, wherein the configuration data value includes a designation of a new precedence level for a mobile terminal, wherein the new precedence level corresponds to a new operating characteristic of the mobile terminal, the configuration data comprising software code and instructions for a configuration of a mobile application, and wherein the request includes a grouping request to classify at least the mobile terminal based in part on the precedence level; and
transmit the configuration data value including the new precedence level to the mobile terminal in response to receiving the request from the client, the mobile terminal including a mobile application defining a previous precedence level such that the mobile terminal loads the configuration data in response to the new precedence level being non-identical to the previous precedence level.

19. The NMC of claim 18, wherein the memory further comprises instructions to:
transmit the configuration data value including the new precedence level to at least a second mobile terminal simultaneously with a transmittal of the configuration data value to the mobile terminal.

20. The NMC of claim 19, wherein the mobile terminal comprises a truck interface unit adapted to provide positioning data with respect to a truck and wherein the configuration data value comprises a position reporting interval.

21. The NMC of claim 18, wherein the new precedence level and the previous precedence level are hierarchical.

22. The NMC of claim 18, wherein the new precedence level and the previous precedence level are represented by numerical values.

23. The NMC of claim 18, wherein the mobile terminal is adapted to load the configuration data value in response to the new precedence level being greater than the previous precedence level.

* * * * *

UNITED STATES PATENT AND TRADEMARK OFFICE
CERTIFICATE OF CORRECTION

PATENT NO. : 8,856,288 B2  
APPLICATION NO. : 12/376725  
DATED : October 7, 2014  
INVENTOR(S) : Mehta et al.

Page 1 of 1

It is certified that error appears in the above-identified patent and that said Letters Patent is hereby corrected as shown below:

On the Title Page item (75) Inventors: Sapna Mehta, San Diego, CA (US);
Daphna Zeilingold, San Diego, CA (US);
Daniel A. Deninger, Carlsbad, CA (US);
Philippe Bergman, San Diego, CA (US)

should read as (75) Inventors: Sapna Mehta, San Diego, CA (US);
Lawrence Alldredge, La Jolla, CA (US);
Daphna Zeilingold, San Diego, CA (US);
Daniel A. Deninger, Carlsbad, CA (US);
Philippe Bergman, San Diego, CA (US)

Signed and Sealed this
Twentieth Day of January, 2015

Michelle K. Lee
*Deputy Director of the United States Patent and Trademark Office*